(12) United States Patent
Szpur

(10) Patent No.: US 6,345,957 B1
(45) Date of Patent: Feb. 12, 2002

(54) CAVITY VERTICAL TURBINE

(76) Inventor: Roman Szpur, 4366 Sillman Pl., Kettering, OH (US) 45440

( * ) Notice: Subject to any disclaimer, the term of this patent is extended or adjusted under 35 U.S.C. 154(b) by 0 days.

(21) Appl. No.: 09/617,358

(22) Filed: Jul. 17, 2000

(51) Int. Cl.$^7$ .......................... B63H 1/26; B64C 11/16; F01D 3/12; F03B 11/02
(52) U.S. Cl. .................................................. 416/197 A
(58) Field of Search .......................... 416/197 A, 197 R

(56) References Cited

U.S. PATENT DOCUMENTS

| | | | | |
|---|---|---|---|---|
| 1,197,766 A | * | 6/1916 | Schmelzer | 416/197 A X |
| 1,200,308 A | * | 10/1916 | Bunnell | 416/197 A X |
| 1,697,576 A | * | 1/1929 | Savonius | 416/197 A X |
| 2,007,963 A | * | 7/1935 | Cleveland | 416/197 A X |
| 4,177,009 A | * | 12/1979 | Baum, Sr. et al. | 416/197 A X |
| 4,245,958 A | * | 1/1981 | Ewers | 416/197 A |
| 5,333,996 A | * | 8/1994 | Bergstein | 416/197 A |

* cited by examiner

*Primary Examiner*—John E. Ryznic
(74) *Attorney, Agent, or Firm*—R. William Graham

(57) ABSTRACT

A cavity vertical turbine includes a rotatably driven electric generator or air compressor, a drive shaft operably connected to the electric generator or air compressor to cause rotation thereof, a first member having a cavity vertical surface and being connected to the shaft such that the cavity vertical surface opposes the drive shaft in a spaced relation therefrom, a second member having a cavity surface and being connected to the shaft such that the cavity surface opposes the drive shaft in a spaced relation therefrom, and wherein the cavity surfaces are further characterized to be in opposing partially overlapping relation to one another.

14 Claims, 6 Drawing Sheets

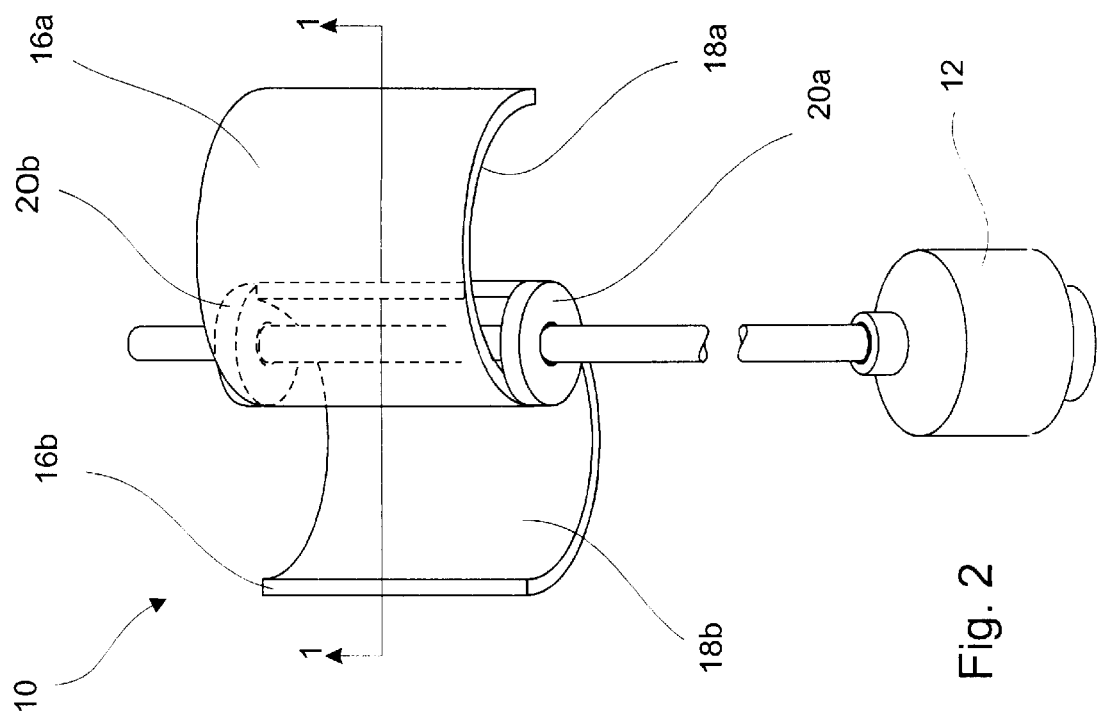
Fig. 2
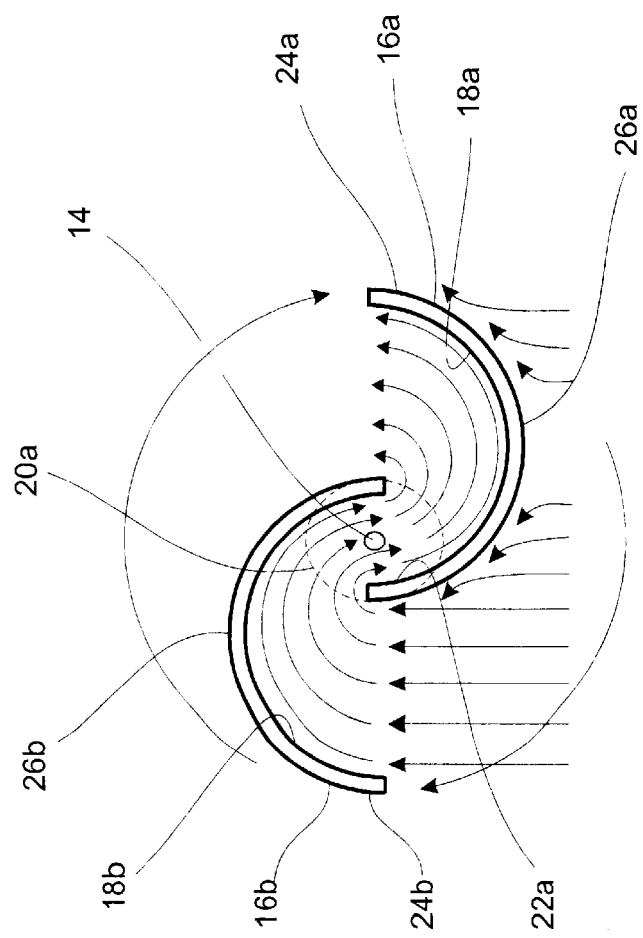
Fig. 1  Operating Principle

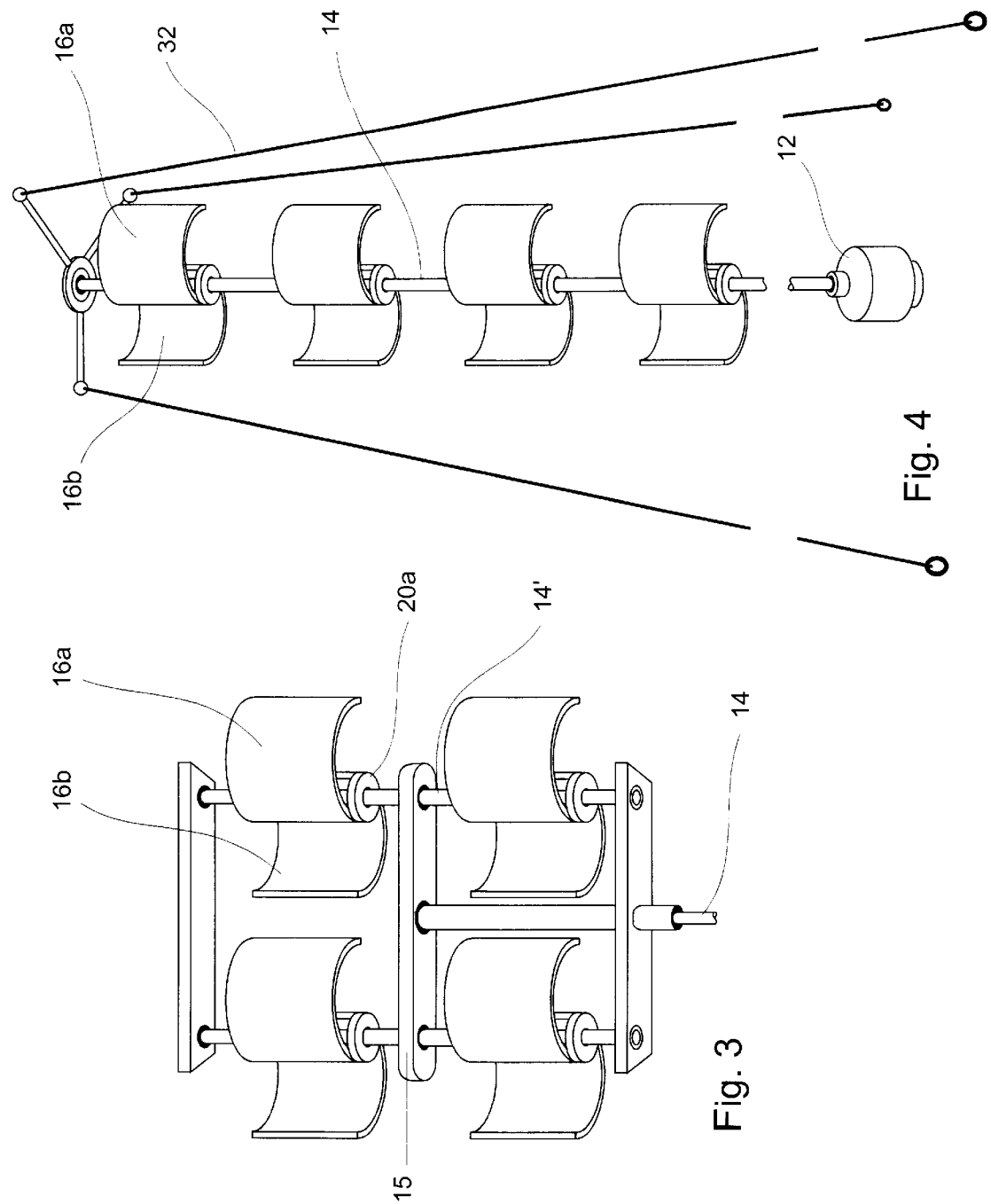

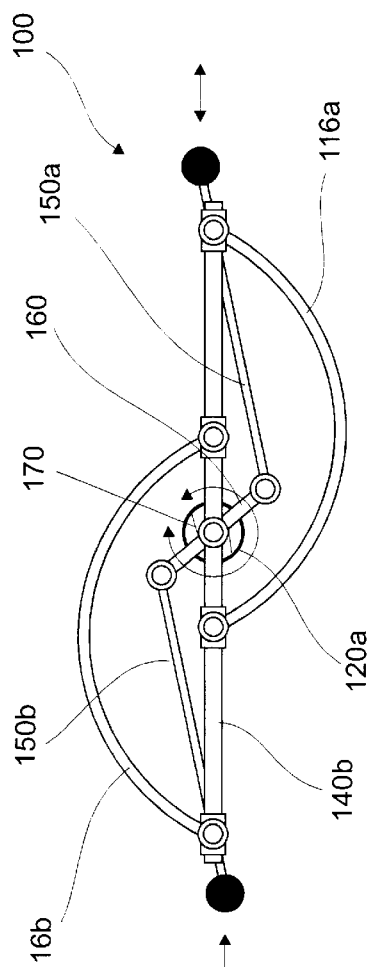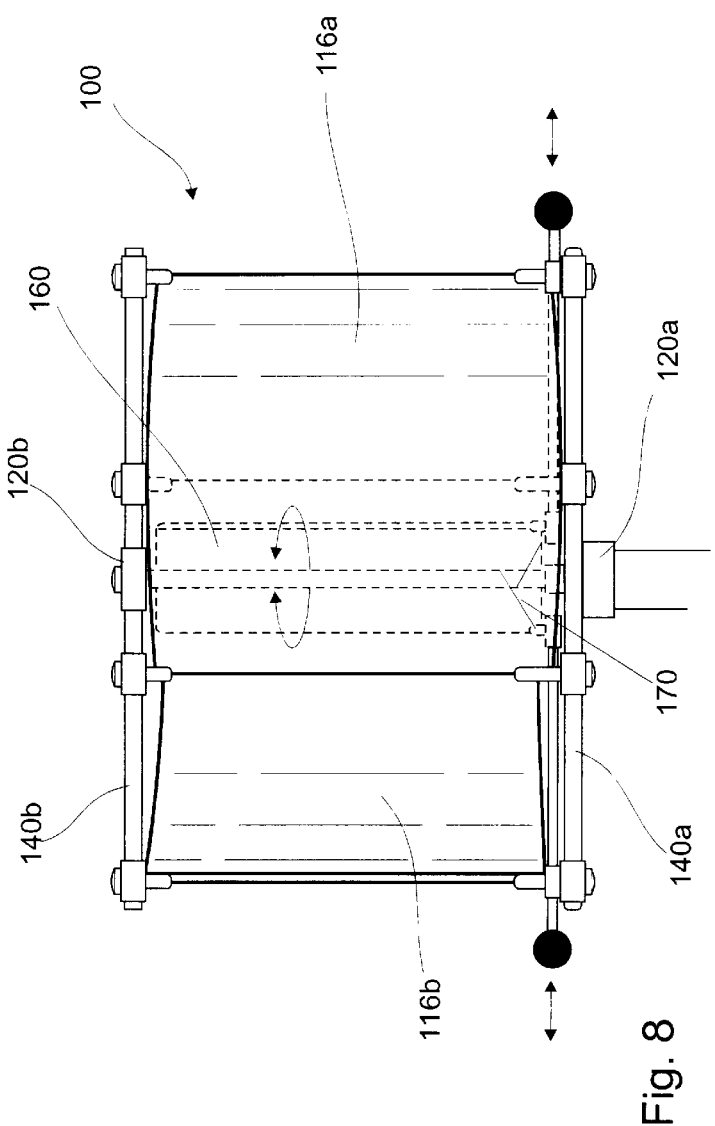

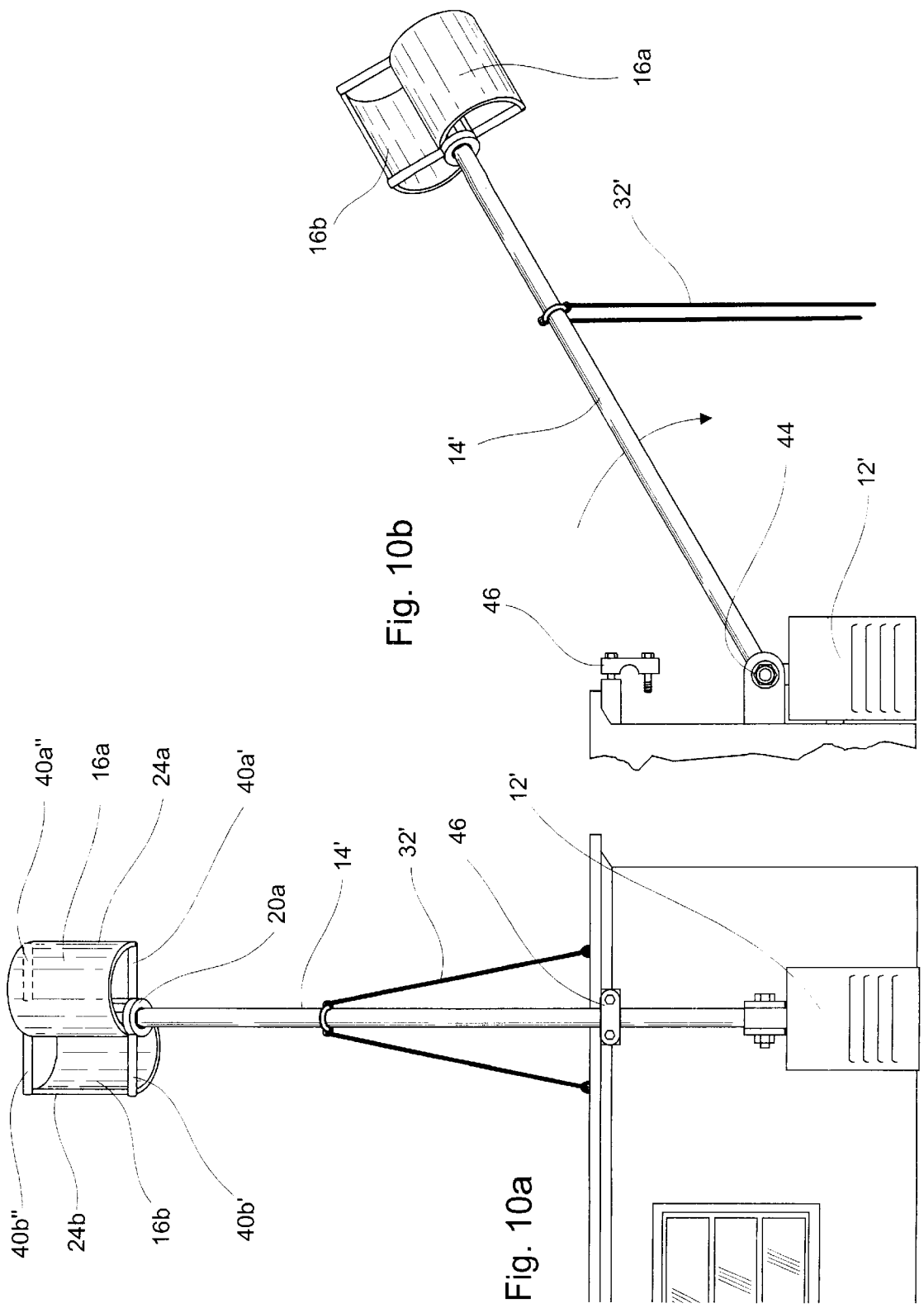

CAVITY VERTICAL TURBINE

BACKGROUND OF THE INVENTION

1. Field of the Invention

The present invention relates to the field of natural energy. More particularly, the invention relates to wind driven turbines.

2. Related Art

There exist numerous types of natural energy driven devices. In the field of wind driven devices, the most common type of device is the windmill. The windmills typically include a plurality of blades or foils and operate on a principle by which air current forces rotation of the blades when properly disposed into a wind current. Here lies a basic flaw in windmills. Particularly, they must be directed into the wind current in order to operate. Some windmills have utilized tails in order to orient the blades into the wind current. However, these designs require a relatively significant amount of wind in order to achieve proper orientation and operation.

Also, wind turbine machines of various designs have been previously proposed for use in converting wind energy to electrical energy. Machines of the type utilizing a plurality of exposed blades rotating about a horizontal axis are in commercial use in a number of different locations. Many such designs lack sufficient structural integrity under heavy wind conditions.

Prior wind turbines typically utilize a rotor which is rotatable about a vertical axis. The rotor normally includes a plurality of blades. Also, pluralities of stationary wind deflectors or wind-directing blades have been used around the rotor to deflect air toward the rotor blades. The typical wind deflectors are generally planar or slightly curved devices which are vertically oriented and are positioned around the perimeter of the rotor.

Even with these improvements, there remains a need to improve the manner in which we harvest the wind as a natural resource. It is desired that there be a wind driven system which is operational without requiring orientation to face an existing prevailing wind current. Accordingly, the present invention aims to provide such a system.

BRIEF SUMMARY OF THE INVENTION

It is an object to improve wind driven energy producing devices.

It is another object to provide a cavity vertical turbine.

It is yet another object to provide a wind driven turbine which is operably safe at relatively high winds.

Accordingly, the present invention is directed to a cavity vertical turbine which aims to meet the aforesaid objectives. The cavity vertical turbine includes a rotatably driven electric generator or air compressor, a drive shaft operably connected to the electric generator or air compressor to cause rotation thereof, a first member having a cavity vertical surface and being connected to the shaft such that the cavity vertical surface opposes the drive shaft in a spaced relation therefrom, a second member having a cavity surface and being connected to the shaft such that the cavity surface opposes the drive shaft in a spaced relation therefrom, and wherein the cavity surfaces are further characterized to be in opposing partially overlapping relation to one another.

The first and second members can be, for example, hemispherical or hemi-cylindrical. The cavity surfaces overlap in a manner such that surface area overlapping portions of the cavity surfaces are less than surface area of non-overlapping portions of cavity surfaces.

Other objects and advantages will be readily apparent to those skilled in the art upon viewing the drawings and reading the detailed description hereafter.

BRIEF DESCRIPTION OF THE DRAWINGS

FIG. 1 is a cross-section view through line 1—1 of FIG. 2 depicting the operating principle of a cavity member of the present invention.

FIG. 2 is a perspective view of an embodiment of a cavity vertical turbine of the present invention.

FIG. 3. is a perspective view of another embodiment plurality of cavity vertical turbines of the present invention.

FIG. 4 is a perspective view of yet another embodiment plurality of cavity vertical turbines of the present invention.

FIG. 7 is a top view of another embodiment of a self-regulating cavity vertical turbine of the present invention.

FIG. 8 is a perspective view of the cavity vertical turbine of FIG. 7.

FIG. 10$a$ is a perspective view of the cavity vertical turbine of FIG. 2 mounted on a building.

FIG. 10$b$ is perspective view of another application of the cavity vertical turbine.

DETAILED DESCRIPTION OF THE INVENTION

Figure 6:
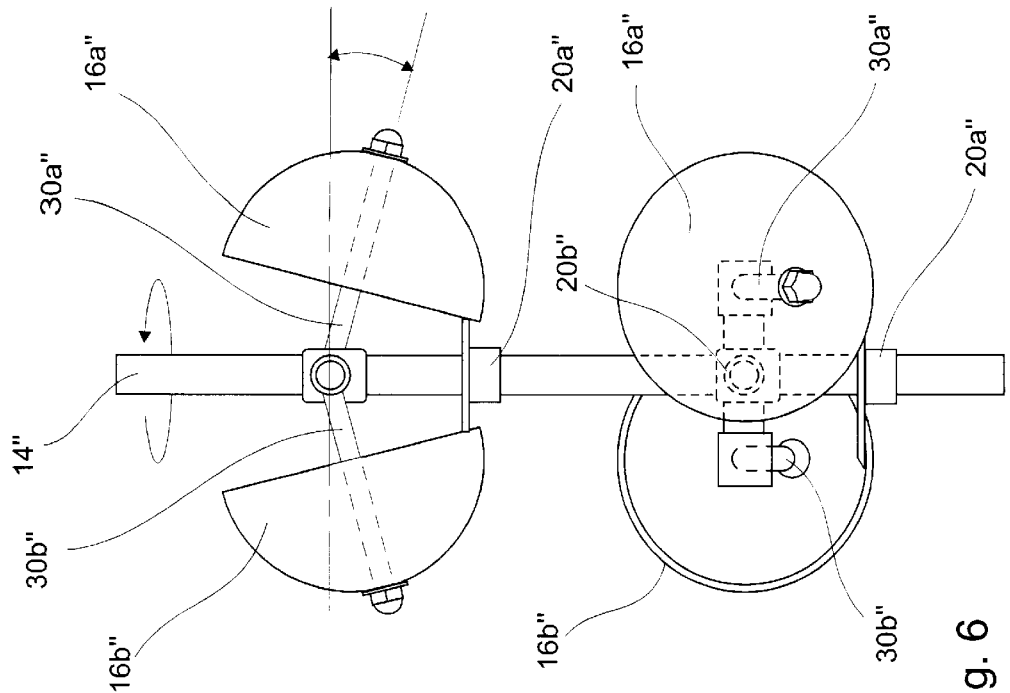
FIG. 6 is a perspective view of another embodiment plurality of cavity vertical turbines of the present invention.

Referring now to the drawings, a cavity vertical turbine the present invention is shown in several embodiments of the Figures set forth herewith. The cavity vertical turbines described herein are shown here as vertically disposed cavity vertical turbines. Several components are common to each embodiment. Namely, each embodiment is operably connected to a rotationally driven electric generator 12 (or air compressor). The generator 12 (or air compressor) is operably connected to a rotor drive shaft 14 upon which rotation thereof causes rotation of the electrical producing components of the generator 12 (or air compressor) thereby producing electricity therefrom (or compressed air for driving existing steam turbines for example to produce electricity in a conventional power station).

Turning now to the cavity vertical turbine 10 as shown in FIG. 2, there are hemi-cylindrical members 16$a$ and 16$b$, each of which having a cavity surface 18$a$ and 18$b$, respectively, (see FIG. 1). The hemi-cylindrical and hemi-spherical and members described herein can be made of a rigid or semi-rigid material. The members 16$a$ and 16$b$ are connected to the rotor drive shaft 14 by way of annular plates 20$a$ and 20$b$ which are axially spaced from one another and fixably interconnect the rotor drive shaft 14 and the ends 22$a$ and 22$b$, respectively.

The cavity surfaces 18$a$ and 18$b$ opposes the rotor drive shaft 14 in a spaced relation from the rotor drive shaft 14. The ends 22$a$ and 22$b$ of members 14$a$ and 14$b$, respectively, are disposed adjacent one another in a manner such that a portion of cavity surfaces 18$a$ and 18$b$ are in opposing partially overlapping relation to one another.

The members 16a and 16b include ends 24a and 24b, respectively, which are in non-adjacent relation to one another such than a remaining portion of the cavity surfaces 18a and 18b, respectively in a non-overlapping relation to one another. In other words, this portion remains exposed to capture wind normal thereto. The non-overlapping portions of cavity surfaces 18a and 18b are greater than the overlapping portions.

As seen in FIG. 1, air is captured by one non-overlapping portion of cavity surface 18b, the wind is deflected toward a space between the ends 22a and 22b and onto the cavity surface 18a and out from the cavity 18a. The forces drive the rotation of the members 16a and 16b as shown. Also, a feature of the design of the invention is the convex surfaces 26a and 26b of members 16a and 16b, respectively. The surfaces 26a and 26b deflect the air to help drive the rotation of the cavity vertical turbine 10. For example, a portion of the air deflected from 26a is captured into cavity 18b which then passes through the opening between the ends 22a and 22b.

Notably, the opening between the ends 22a and 22b is significantly less than the opening between either ends 22a and 24b or 22b and 24a. Thus, as air moves into cavity 18b and through the narrower opening, a pressurized air stream is exerted on the cavity surface 18a.

FIGS. 3 and 4 illustrate the use of multiple members 16a and 16b. FIG. 3 shows the members 16a and 16b in a stacked and side by side relation. The stacked relation drive rotor shafts 14' and 14" which in turn drive rotor shaft 14 via a gear drive train mechanism (not shown) in housing 15. FIG. 4 depicts another stacked relation on a vertically disposed shaft 14. Connected to a top portion of the shaft 14 is a stabilizer member 30 to which stabilizing lines 32 are connected to enable securing the same to the ground.

Figure 9:
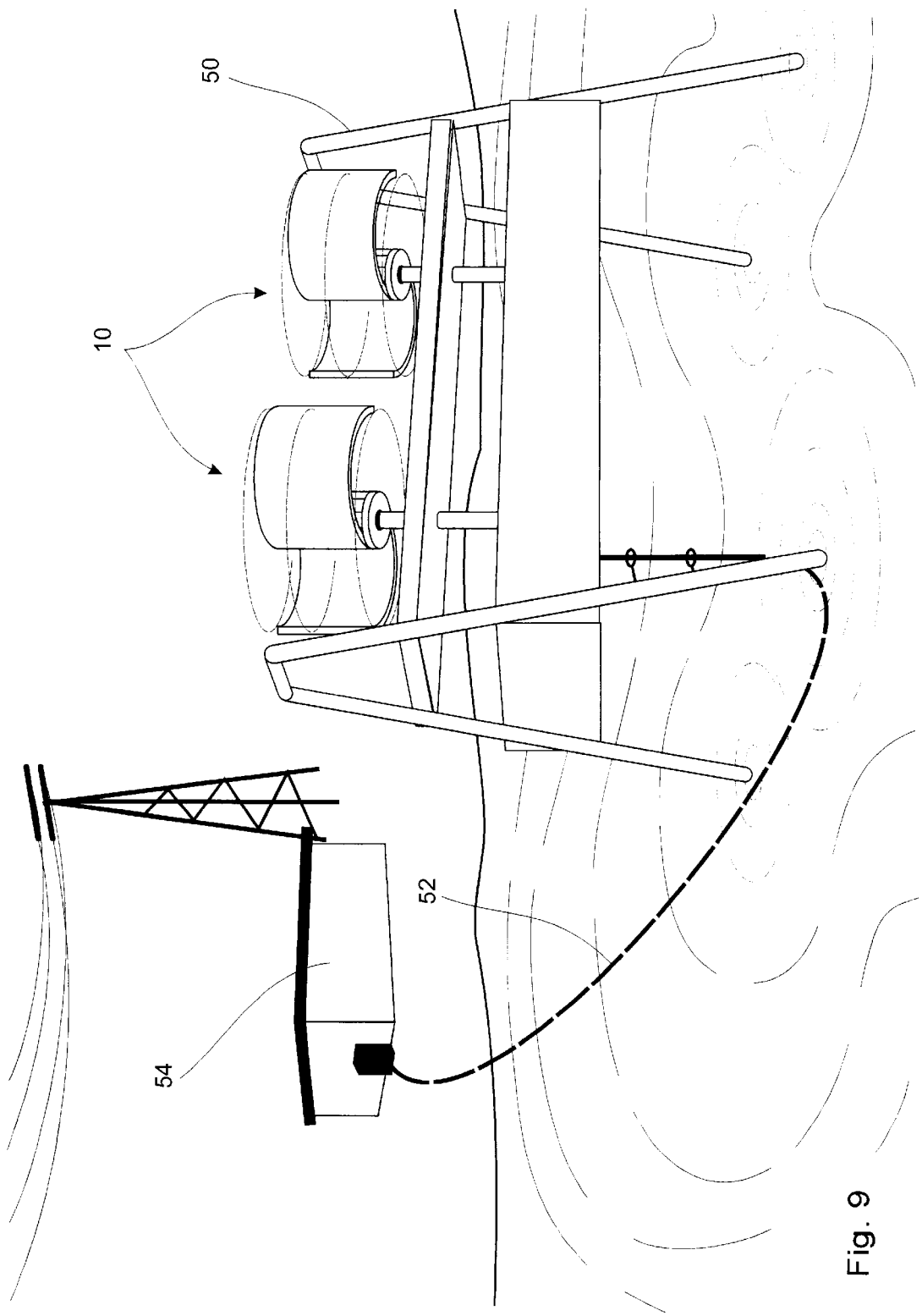
FIG. 9 is depiction of an offshore installation of cavity vertical turbines.

As shown in FIG. 9, the cavity vertical turbines 10 can be mounted in an offshore capacity. A support structure 50 can be suitably anchored to the ocean floor and suitable electrical line 52 (or air line) ran to the shore line to a power storage/supply/conversion facility 54. The cavity vertical turbines 10 can be located in prevailing winds and can move in any direction.

FIGS. 10a and 10b depict the cavity vertical turbine 10 mounted on a building to supply power thereto. The members 16a and 16b are additionally suited with tie pieces 40a', 40a" and 40b', 40b", respectively. Tie pieces 40a' and 40b' interconnect end 24a with plates 20a and 20b, respectively, and 40a" and 40b" interconnect end 24a with plates 20a and 20b, respectively. The rotor drive shaft 14' is rotatably connected to generator 12' (or air compressor). Here, the shaft 14' is shown to include a universal connection 44 to permit the lowering of thereof A bearing mount 46 is shown removably connected to the building to provide stability of the rotor drive shaft 14'. Support lines 32' are also provided to interconnect and support the cavity vertical turbine 10

Figure 5:
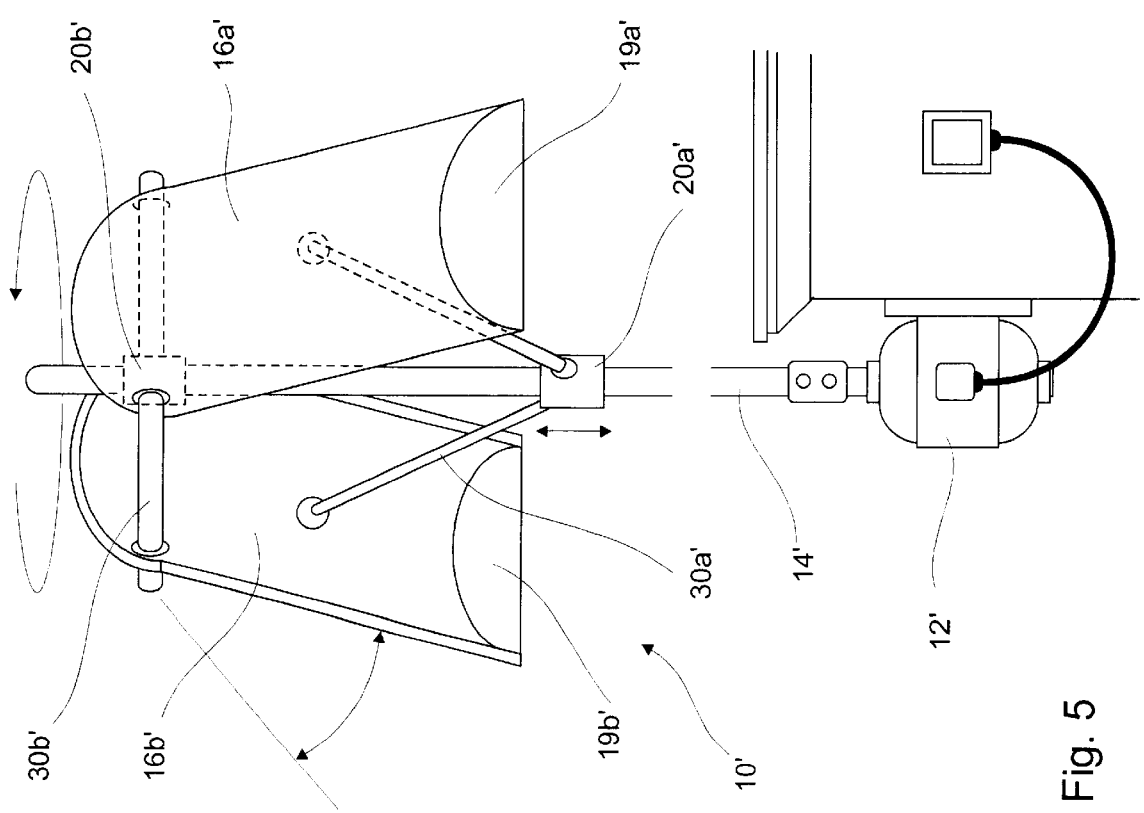
FIG. 5 is a perspective view of still another embodiment of a closed-end cavity vertical turbine of the present invention.

Turning now to the embodiment in FIG. 5, there is disclosed a closed-end cavity vertical turbine 10' which includes similar hemi-cylindrical members 16a' and 16b'. Here, the members 16a' and 16b' include an enclosed end 19a' and 19b', respectively. The members 16a' and 16b' are connected to collars 20a' and 20b' via tie bars 30a' and 30b', respectively. As shown, the members 16a' and 16b' are pitched at an incline narrower at the top and wider at the bottom and believed to aid in capturing air and redirecting it to the principle of the invention as previously described. The cavity vertical turbine 10' is shown here mounted to a building.

In contrast, the embodiment shown in FIG. 6 depicts hemispherical members 16a" and 16b" which are inclined narrower at the bottom and wider at the top. The members 16a" and 16b" are connected to collars 20a" and 20b" via tie bars 30a" and 30b", respectively. In this depiction, there exist two sets of members 16a" and 16b" which are in axially spaced relation at approximately 90 degrees.

The inclines shown in FIGS. 5 and 6 are believed to aid in the enhanced rotation of parts. It is contemplated that one particular incline may be of more use in the one hemisphere of the world than in the other due wind currents and the direction of rotation.

Still another embodiment of the cavity vertical turbine 100 is disclosed in FIGS. 7 and 8 which is self regulating. The members 116a and 116b are interconnected via tie bars 140a and 140b. Tie bars 140a and 140b similarly connect to collars 120a and 120b, respectively. The principles set forth above apply to cause rotation of the rotor drive shaft 114, with an additional limitation of a self-regulation baffle 160. The baffle 160 is rotatably connected about the shaft 114 and is normally biased by a spring 170 to remain in an open position wherein air flow is permitted in a manner previously described. Ends of the baffle 160 are connected to a shaft 140a and 140b having weighted ends. The shafts 140a and 140b are shown here slidably connected to the tie bar 140a. As the rotational speed exceeds a predetermined amount, the force constant of the spring is overcome and the baffle 160 rotates to a closed position, thus blocking air flow between the members 116a and 116b. This provides a safety mechanism in times of extreme wind speed.

As used herein the term "vertical" is defined as a position generally normal to the earth's surface along the lines of the earth's gravitational forces. "Cavity vertical turbine" includes, but is not limited to, cavity surfaces as shown and described herein which are disposed on the vertical rotor drive shaft and have cavity members which generally rotate along a horizontal plane relative to the vertical position and gravitational forces stated. The above described embodiments are set forth by way of example and are not for the purpose of limiting the present invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. A cavity vertical turbine, comprising:
 a rotatably driven electric generator;
 a generally vertically disposed drive shaft operably connected to said electric generator to cause rotation thereof;
 a first member having a cavity surface and having means for connecting said first member to said shaft such that said cavity surface opposes said drive shaft in a spaced relation therefrom;
 a second member having a cavity surface and having means for connecting said second member to said shaft such that said cavity surface opposes said drive shaft in a spaced relation therefrom; and
 wherein said cavity surfaces are further characterized to be in opposing partially overlapping relation to one another and said first member and said second member each having a generally vertically disposed end which remains open throughout operation to permit air flow thereby.

2. The cavity vertical turbine of claim 1, wherein sad first member and sad second member are characterized as semi-spherical.

3. The cavity vertical turbine of claim 1, wherein said first member and said second member are characterized as semi-cylindrical.

4. The cavity vertical turbine of claim 1, wherein said cavity surfaces overlap in a manner such that surface area overlapping portions of said cavity surfaces are less than surface areas of non-overlapping portions of cavity surfaces.

5. The cavity vertical turbine of claim 1, wherein said cavities are further characterized such that when air currents hit a non-overlapping portion of said cavity surface at least a portion of the air is deflected into an overlapping portion of said opposing cavity surface and a portion of air is free to travel generally vertically along said cavity and out said end.

6. The cavity vertical turbine of claim 1, which further includes means for regulating air flow between said cavity surfaces.

7. A cavity vertical turbine, comprising:

rotatably driven air compressor;

a generally vertically disposed drive shaft operably connected to said air compressor to cause generation of compressed air therefrom;

a first member having a cavity surface and having means for connecting said first member to said shaft such that said cavity surface opposes said drive shaft in a spaced relation therefrom;

a second member having a cavity surface and having means for connecting said second member to said shaft such that said cavity surface opposes said drive shaft in a spaced relation therefrom; and wherein said cavity surfaces are further characterized to be in opposing partially overlapping relation to one another and said first member and said second member each having a generally vertically disposed end which remains open throughout operation to permit air flow thereby.

8. The cavity vertical turbine of claim 7, wherein said first member and said second member are characterized as semi-spherical.

9. The cavity vertical turbine of claim 7, wherein said first member and said second member are characterized as semi-cylindrical.

10. The cavity vertical turbine of claim 7, wherein said cavity surfaces overlap in a manner such that surface area overlapping portions of said cavity surfaces are less than surface areas of non-overlapping portions of cavity surfaces.

11. The cavity vertical turbine of claim 7, wherein said cavities are further characterized such that when air currents hit a non-overlapping portion of said cavity surface at least a portion of the air is deflected into an overlapping portion of said opposing cavity surface and a portion of air is free to travel generally vertically along said cavity and out said end.

12. The cavity vertical turbine of claim 7, which further includes means for regulating air flow between said cavity surfaces.

13. The cavity vertical turbine of claim 1, wherein said first member and said second member each have generally disposed vertical ends which are open permit air flow thereby.

14. The cavity vertical turbine of claim 7, wherein said first member and said second member each have generally disposed vertical ends which are open permit air flow thereby.

* * * * *